US010834868B2

(12) United States Patent
Lovato (10) Patent No.: US 10,834,868 B2
(45) Date of Patent: Nov. 17, 2020

(54) EFFICIENT INJECTION AND MIXING OF CHEMICALS INTO A FLUID DELIVERY SYSTEM

(71) Applicant: Zachary Lovato, Denver, CO (US)

(72) Inventor: Zachary Lovato, Denver, CO (US)

( * ) Notice: Subject to any disclaimer, the term of this patent is extended or adjusted under 35 U.S.C. 154(b) by 710 days.

(21) Appl. No.: 14/807,573

(22) Filed: Jul. 23, 2015

(65) Prior Publication Data

US 2017/0020062 A1 Jan. 26, 2017

(51) Int. Cl.
| | |
|---|---|
| *A01C 23/04* | (2006.01) |
| *B01F 5/04* | (2006.01) |
| *B01F 5/06* | (2006.01) |
| *B05B 7/30* | (2006.01) |

(52) U.S. Cl.
CPC .......... *A01C 23/042* (2013.01); *B01F 5/0413* (2013.01); *B01F 5/0602* (2013.01); *B05B 7/30* (2013.01)

(58) Field of Classification Search
CPC .... B01F 5/0498; B01F 5/0428; B01F 5/0413; B05B 7/30; C02F 1/685; C02F 1/686; C02F 1/78; A01C 23/042
USPC ...................................................... 366/163.2
See application file for complete search history.

(56) References Cited

U.S. PATENT DOCUMENTS

| | | | | |
|---|---|---|---|---|
| 1,085,348 | A | * | 1/1914 | Ledoux ................. B01F 5/0496 137/205.5 |
| 5,178,181 | A | | 1/1993 | Craig |
| 6,701,953 | B2 | * | 3/2004 | Agosta .................. B01F 5/0413 137/205.5 |
| 7,093,606 | B2 | | 8/2006 | Roberts |
| 7,717,353 | B2 | | 5/2010 | Matulis |
| 8,297,535 | B1 | | 10/2012 | Reid |
| 8,434,697 | B1 | | 5/2013 | Olt |
| 8,739,830 | B2 | | 6/2014 | Bradbury et al. |
| 2004/0094208 | A1 | | 5/2004 | Marsden et al. |
| 2011/0265897 | A1 | | 11/2011 | Sinda |
| 2013/0327720 | A1 | * | 12/2013 | McGuire ................... C02F 1/36 210/748.03 |
| 2016/0025117 | A1 | * | 1/2016 | Engelhard ............. B01F 5/0423 137/9 |

* cited by examiner

*Primary Examiner* — Elizabeth Insler
(74) *Attorney, Agent, or Firm* — Dorsey & Whitney LLP (57) ABSTRACT

A fluid mixing and delivery system, e.g., for use in chemical injection of irrigation systems or wash-down stations, has a main fluid conduit with an inlet and an outlet, a bypass conduit with an inlet and an outlet, a venturi, a chemical storage tank, and a static mixer. The bypass conduit inlet connects to the main fluid conduit downstream of the main fluid conduit inlet and the bypass section outlet connects to the main fluid conduit upstream of the main fluid conduit outlet. The venturi is located in-line with the bypass conduit between the bypass conduit inlet and the bypass conduit outlet. The chemical storage tank is fluidly connected to an individual supply line, which fluidly connects to the venturi. The static mixer is located in-line with the main fluid conduit between the bypass conduit outlet and the main fluid conduit outlet.

15 Claims, 7 Drawing Sheets

EFFICIENT INJECTION AND MIXING OF CHEMICALS INTO A FLUID DELIVERY SYSTEM

TECHNICAL FIELD

The disclosure concerns systems for in-line introduction of chemical additives in fluid delivery systems, for example, in irrigation systems.

BACKGROUND

Many fluid transport or delivery systems used to deliver water to an end application require the addition of a chemical additive. The chemical additive used depends on the type of end application. For example, irrigation systems require the delivery of water to sprinkler heads that are spaced large distances from each other, but the turf or other vegetation that the water is supplied to also benefits when fertilizers are added to the main water system. Alternatively, wash-down applications in a manufacturing or processing facility may require a large amount of water in order to clean various affected areas, but the cleaning process also benefits when chlorine is added to the main water system to help sanitize the area being cleaned. The chemical additive, for example a fertilizer or chlorine type additive, can be added to the main water conduit through an in-line injection system or a system that allows the main water supply to flow through a component where the full strength solid-form chemical additive is available to be added through a dilution method.

A chemical additive can be added to optimize the end application, but the actual addition of the chemical additive is inefficient. While controlled systems such as greenhouses and hydroponic applications use expensive, complicated computer controlled injection systems, those systems are unreasonable to use in a robust, significant-sized system such as irrigation for a golf course or a wash-down application in a processing facility. In large volume and/or high pressure applications, expensive injection pump systems have been used to facilitate the addition of the chemical additive. The pump must overcome the pressure already in the system, which is generally high as it is required to pump a large volume of water over a certain distance. The injection system might also create additional undesirable pressure losses. Even so, the injected chemical often does not mix well or completely with the primary fluid in the system, which can result in uneven application of the chemical additive. Furthermore, the addition of the chemical through a dilution method requires the amount of chemical additive to be somewhat uncontrolled. The dilution rates of solid chemicals may vary such that the end application will receive a higher amount of the chemical with the higher dilution rate, regardless of the application's optimal chemical additive needs.

The information included in this Background section of the specification, including any references cited herein and any description or discussion thereof, is included for technical reference purposes only and is not to be regarded subject matter by which the scope of the invention as defined in the claims is to be bound.

SUMMARY

One exemplary implementation of a chemical injection system disclosed herein uses a venturi injection system installed on a bypass line branching from and returning to a main flow line. The venturi may siphon one or more chemicals from one or more storage tanks and entrain the chemicals within the flow of the bypass line. Once the flow from the bypass line with the injected chemical(s) returns to the main line, a static mixer may be used to more completely and homogenously mix the chemical into the entirety of the fluid flow through the main line. One or more tanks may hold a fertilizer component to be mixed with the water from the main conduit. The mixture may then be supplied to an application using an irrigation system. The fertilizer mix may be customized with specific amounts of chemicals that the soil fed by the irrigation system is determined to need or that will best benefit the plants growing in the soil. The fertilizer mix could take into account the ideal mixture of potassium, nitrogen, phosphorus and other desirable nutrients that would enable to soil and the plant growing in the soil to perform its best. Irrigation water with the proportional homogenous mixture of fertilizer and nutrient additive facilitates the delivery of the nutrient mixture directly to the root zone of the plant material; eliminating unnecessary over fertilization, storm water pollution runoff, and water wasted dissolving solid fertilizer using traditional topical granular methods.

In a different embodiment, the chemical injection system allows for the injection of chlorine or a similar chemical into water for use in wash-down applications such as food processing machinery, newly installed potable water distribution systems, chemical spraying/spreading devices, boat hulls, etc. The system utilizes an injection and mixing method that results in a low amount of flow restriction in the system. The chemical may be injected into a portion of the fluid flow through a bypass flow passage with a venturi, which is then returned to the main fluid stream. The injected chlorine or similar chemical may be further mixed efficiently downstream, for example, using a static mixer.

In one exemplary implementation, a fluid mixing and delivery system has a main fluid conduit with an inlet and an outlet, a bypass conduit with an inlet and an outlet, a venturi, a chemical storage tank, and a static mixer. The bypass conduit inlet connects to the main fluid conduit downstream of the main fluid conduit inlet and the bypass section outlet connects to the main fluid conduit upstream of the main fluid conduit outlet. The venturi is located in-line with the bypass conduit between the bypass conduit inlet and the bypass conduit outlet. The chemical storage tank is fluidly connected to an individual supply line, which fluidly connects to the venturi. The static mixer is located in-line with the main fluid conduit between the bypass conduit outlet and the main fluid conduit outlet.

In another exemplary implementation, a method is provided for fluid mixing in a high volume, high pressure fluid delivery system. A portion of a main fluid flowing through a main fluid conduit is diverted into a bypass conduit branching from and returning to the main fluid conduit. The bypass conduit has an inlet, a venturi, and an outlet. A chemical is stored in a storage tank. The storage tank is fluidly connected to the venturi. The chemical flows from the storage tank to the venturi. The chemical is entrained into the diverted portion of the main fluid via a pressure drop in the diverted portion of the main fluid flowing through the venturi. The entrained chemical and diverted portion of the main fluid flow through the bypass conduit outlet to rejoin the main fluid in the main fluid conduit. The entrained chemical, the diverted portion of the main fluid, and the main fluid flow through a static mixer, creating a substantially homogenous mixture. The substantially homogenous mixture flows through the fluid delivery system to an application.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. A more extensive presentation of features, details, utilities, and advantages of the present invention as defined in the claims is provided in the following written description of various embodiments of the invention and illustrated in the accompanying drawings.

DETAILED DESCRIPTION

FIGS. 1-5 show a first exemplary embodiment of a chemical injection system 1 for use in-line with an irrigation system. The injection system 1 may be housed in a typical valve box 2 for connection with a typical irrigation line 6. The injection system 1 has a main fluid conduit 3 for receiving and transferring a fluid flow (e.g., irrigation water). A flow restriction valve 5 may be provided along the main fluid conduit 3 at an intermediate location along the length thereof. A first, upstream end of the main fluid conduit 3 may extend through an aperture in a wall of the valve box 2 and be fitted with a upstream pipe connector 25 on the outside of the valve box 2 for connection with an upstream outlet of the irrigation line 6.

Figure 1:
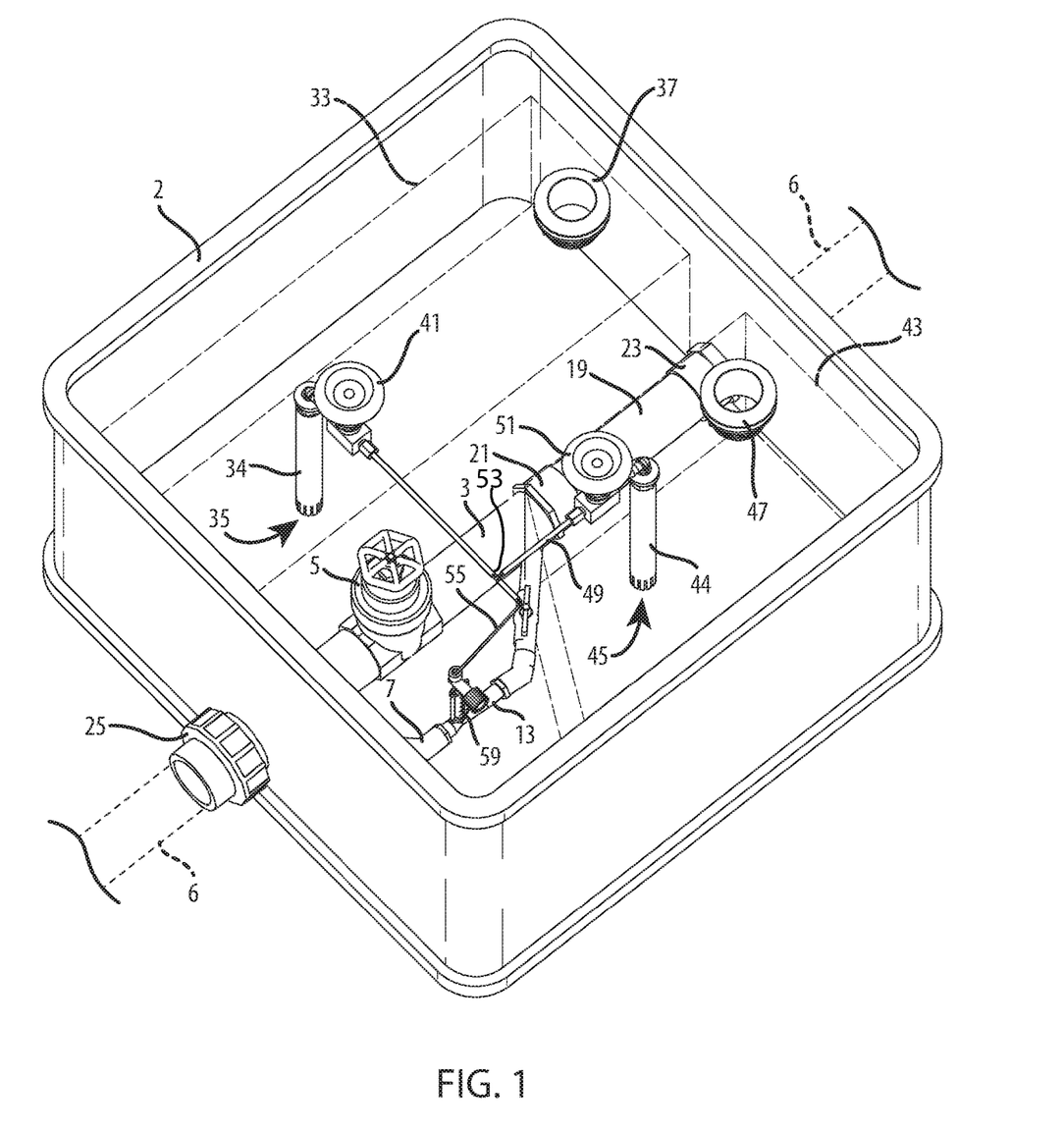
FIG. 1 is an isometric view of an embodiment of a chemical injection system for inline insertion into an irrigation system.
Figure 2:
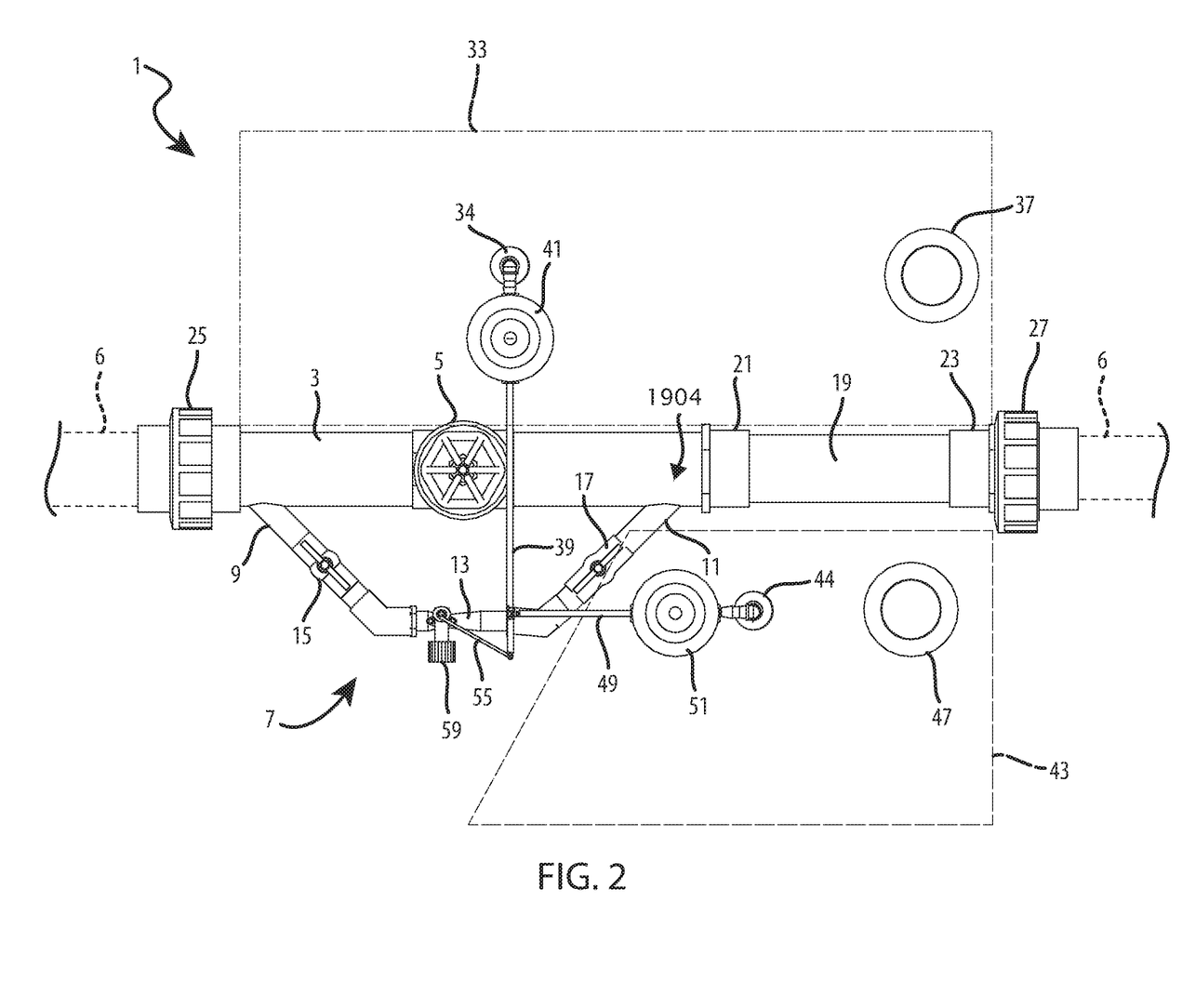
FIG. 2 is a top plan view of the embodiment shown in FIG. 1.
Figure 3:
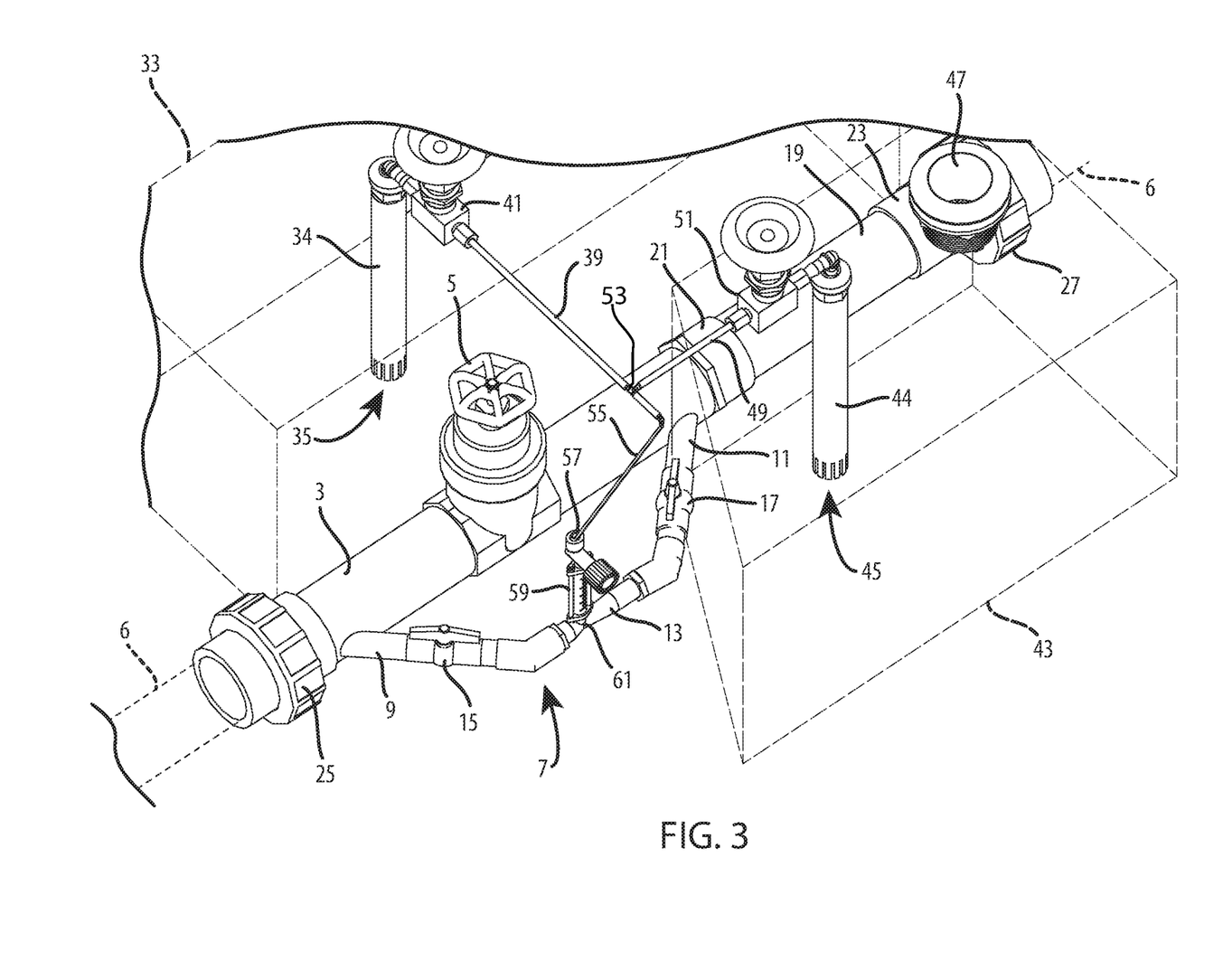
FIG. 3 is an isometric view of the chemical injection system shown in FIG. 1 with the valve box removed.

A bypass conduit 7 is connected to the main fluid conduit 3 with an inlet 9 downstream of the upstream pipe connector 25 but upstream of the flow restriction valve 5 and an outlet 11 downstream of the flow restriction valve 5. The bypass conduit 7 has a venturi 13 located between the inlet 9 and outlet 11. The bypass conduit 7 may have an upstream valve 15 located upstream of the venturi 13 and a downstream valve 17 located downstream of the venturi.

Figure 5:
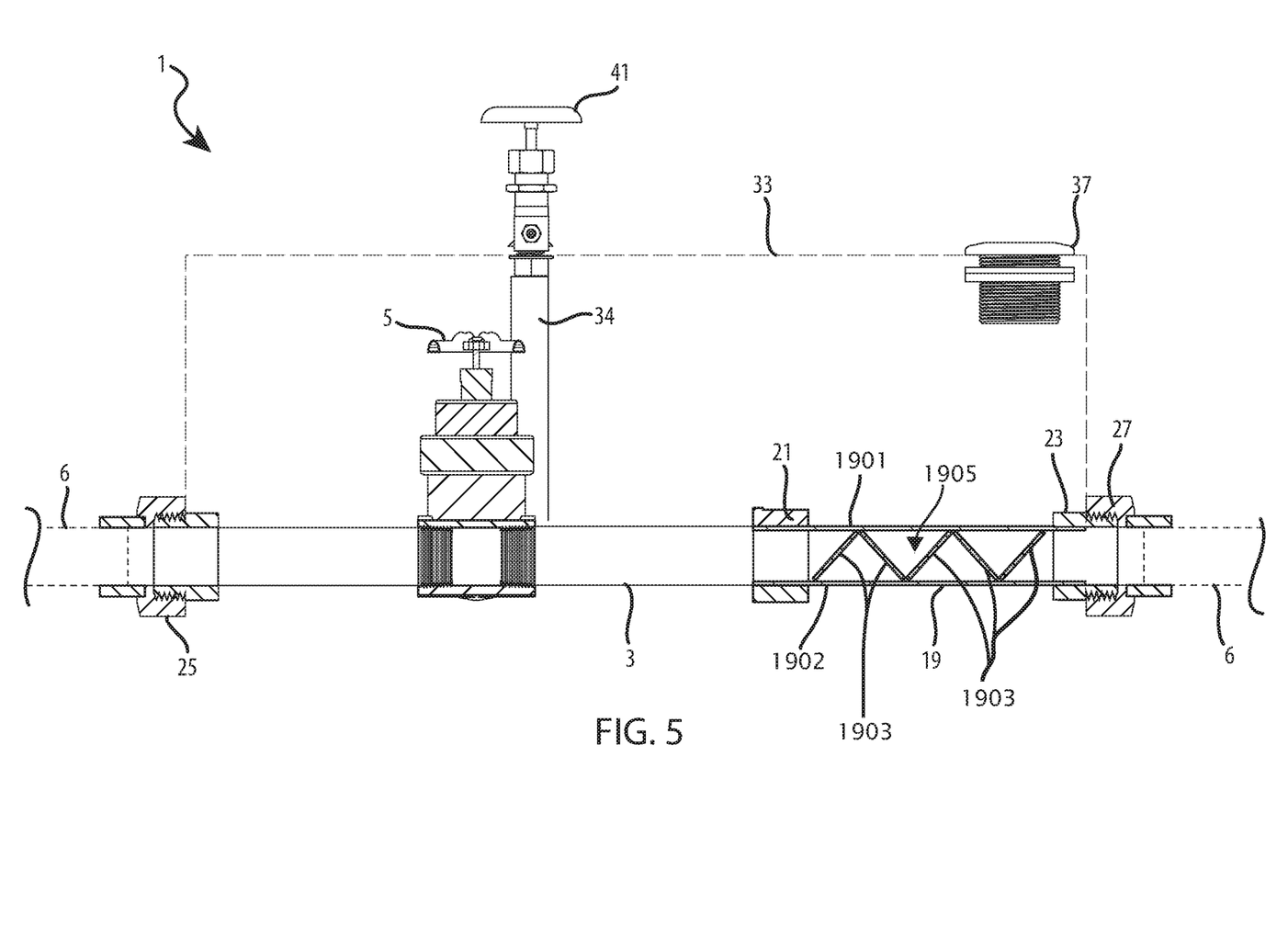
FIG. 5 is a side elevation view in cross section of the chemical injection system of FIG. 1 showing the 1 static mixer in detail.

The system 1 also has a static mixer 19 connected to the main fluid conduit 3 downstream of the bypass outlet 11. The static mixer 19 has an inlet 21 and an outlet 23. As shown in FIG. 3, the inlet 21 of the exemplary static mixer 19 is downstream of junction 1904 where the bypass conduit 7 rejoins the main fluid conduit 3. As shown in the example of FIG. 3, the static mixer 19 is may be cylindrically-shaped and define a mixing conduit 1905 therein. As shown in the example of FIG. 5, a cross-sectional view of the static mixer 19 shows an upper edge 1901 and a lower edge 1902 of the interior wall defining the mixing conduit 1905 of the static mixer 19. As shown in the example of FIG. 5, the upper edge 1901 and the lower edge 1902 extend parallel to each other. As shown in the example of FIG. 5, a plurality of mixing elements 1903 are positioned within the static mixer 19 between the inlet 21 and the outlet 23. As shown in the example of FIG. 5, the mixing elements 1903 are positioned at various angles within the static mixer 19, such angular arrangements apparent when comparing the mixing elements 1903 to parallel relationship between the upper edge 1901 and the lower edge 1902. As shown in the example of FIG. 5, the mixing elements 1903 extend across areas within the static mixer 19, thus interrupting fluid flow through the static mixer 19. As shown in the example of FIG. 5, the mixing elements 1903 extend across a center portion of the mixing conduit 1905 of the static mixer 19, for example, as shown extending between the upper edge 1901 and the lower edge 1902. In use, the mixing elements 1903 interrupt a flow path of fluid through the mixing conduit 1905 of the static mixer 19 so that the flow of the heterogeneous mixture 70 is transformed into a substantially homogenous mixture while passing through the mixing conduit of the static mixer 90 and impacting the mixing elements 1903. As shown in the figures, the static mixer 19 inlet 21 and outlet 23 may be female fittings. The static mixer inlet 21 may receive the downstream end of the main fluid conduit 3 to form a fluid-tight connection, e.g., by adhesive, chemical welding or bonding, or via a threaded connection. The outlet 23 and nipple 29 may form a fluid-tight connection, e.g., by adhesive, chemical welding or bonding, or via a threaded connection therebetween. The static mixer outlet 23 may receive a short nipple 29 within the female fitting to extend through a wall of the valve box 2 for connection a downstream pipe connector 27. The downstream pipe connector 27 connects to a downstream end of the irrigation line 6.

The system 1 has a first chemical storage tank 33 housed within the valve box 2. The first tank 33 may contain a first intake tube 34 extending from a bottom of the first tank 33 upward and through a top wall of the first tank 33. The interface between the top wall of the first tank 33 and the intake tube 34 may have a fluid tight seal. The bottom of the first intake tube 34 may be formed with a plurality of slots 35. A vented cap 37 may securely fit within a fill aperture in the top wall of the first tank 33. A supply line 39 may be connected to the top of the intake tube 34 as it leaves the first tank 33 and an outlet valve 41 may be connected in-line with the supply line 39.

The system 31 may have a second chemical storage tank 43 housed within the valve box 2. The second tank 43 may contain a second intake tube 44 extending from a bottom of the second tank 43 upward and through a top wall of the second tank 43. The interface between the top wall of the second tank 43 and the second intake tube 44 may have a fluid tight seal. The bottom of the second intake tube 44 may be formed with a plurality of slots 45. A vented cap 47 may securely fit within a fill aperture in the top wall of the second tank 43. A supply line 49 may be connected to the top of the intake tube 34 as it leaves the second tank 43, and an outlet valve 51 may be connected in-line with the supply line 49.

The supply line 39 from the first tank 33 may be joined to the supply line 49 from the second tank 43 at a junction 53. The junction 53 is connected to an additive outlet line 55 that is then connected to the inlet 57 of a flow meter 59. An outlet 61 of the flow meter 59 is connected to the venturi 13. The flow meter 59 is used to control the amount of additive fluid that can be pulled into the bypass conduit 7 by the venturi 13.

Figure 4:
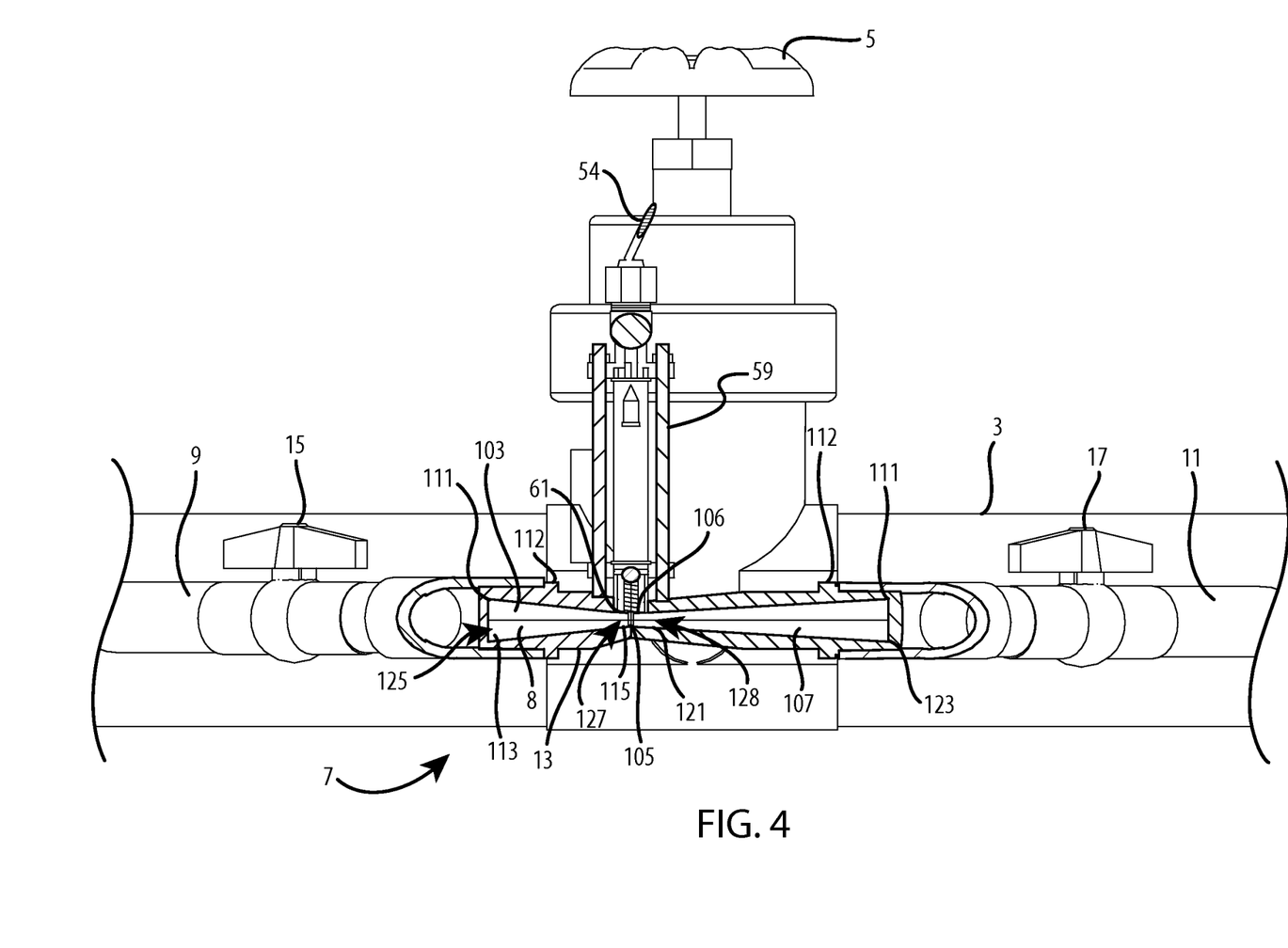
FIG. 4 is a view of the venturi component in detail 1.

As shown in FIG. 4, the venturi 13, a convergent-divergent flow nozzle usually circular in cross-section, may have a relatively short convergent section (the confuser 103) upstream of a throat 105 followed by a gradually diverging section (the diffuser 107). The venturi 13 may have a sleeve 111 at both ends for installation in-line on the bypass conduit 7 and flanges 112. The outlet 61 of the flow meter 59 is connected to the venturi 13 at a junction 106 located at the throat 105. The confuser 103 tapers from a first diameter 113 and a second diameter 115. The first diameter 113 is larger than the second diameter 115. The throat 105 has a consistent diameter throughout a length of the throat 105. The diffuser 107 tapers from a first diameter 121 and a second diameter 123. The second diameter 123 is larger than the first diameter 121.

When fluid, e.g., water, flows through the system 1, the bypass conduit 7 can be activated or deactivated depending upon the need. If the end application doesn't require the addition of chemicals (e.g., fertilizers or pest controls), the upstream valve 15 and the downstream valve 17 of the bypass conduit 7 may be adjusted into closed positions, and a portion of the fluid will not be diverted. Should the end application require the addition of chemicals, the upstream valve 15 and downstream valve 17 of the bypass conduit 7 may be manipulated so that a portion of the fluid is diverted into the bypass conduit 7 at the inlet 9 of the bypass conduit 7. The portion of the fluid flowing through the bypass conduit 7 then flows through the venturi 13.

The Venturi effect is a phenomenon that occurs when a fluid flowing through a pipe is forced through a narrow section. The flow through the narrow section causes a pressure decrease and a velocity increase of the fluid in the throat 105 of the venturi 13. The effect is mathematically described by the Bernoulli equation and can be observed in both nature and industry. The flow restriction valve 5 may be used to restrict flow through the main fluid conduit 3 in order to increase flow through the bypass conduit 7 if necessary to increase the effect of the venturi 13 to entrain chemicals in the flow as further described below.

The confuser 103 in the venturi 13 creates a restriction that varies the flow characteristics of the fluid traveling through the bypass conduit 7. The volume of the fluid in the bypass conduit 7 decreases from the larger first diameter 113 and then is forced through the smaller second diameter 115 of the confuser 103 and into the constant diameter throat 105. The velocity of the fluid in the throat 105 increases while the pressure of the fluid simultaneously decreases. Therefore, the fluid entering the confuser 103 is at a first pressure 125 while the fluid within the throat 105 is at a lower second pressure 127 and flows at a higher velocity. As the fluid leaves the throat 105 and enters the diffuser 107, the rapid fluid expansion results in a localized pressure drop from the second pressure 127, creating a vacuum 128 which pulls additive fluid in the additive outlet line 55 into the venturi 13, thereby entraining the additive fluid in the fluid traveling through the bypass conduit 7.

If the first outlet valve 41 is open and there is a liquid chemical in the first tank 34, the vacuum 128 created by the venturi 13 in the bypass conduit 7 causes the first chemical to flow through the intake tube 34 in the first tank 33, through the outlet valve 41, and through the supply line 39. If there is a liquid chemical in the second tank 43 and the second outlet valve 51 is open, the second chemical will also flow through the intake tube 44 in the second tank 43, through the outlet valve 51, and through the supply line 49. The slots 35, 45 at the bottom of each of the intake tubes 34, 44 may act in part as filters to prevent large particulates that might be in the tanks 33, 43 from entering the supply lines 39, 49. The slots 35, 45 may also prevent a seal from forming between the bottoms of the intake tubes 34, 44 and the bottoms of the tanks 33, 43, which could limit or arrest fluid flow. Also, as noted above, the caps 37, 47 for each of the tanks 33, 43 are vented in order to prevent a vacuum from forming within the tank 33, 43 when fluid is drawn through the intake tubes 34, 44, which could also limit or impede fluid flow.

At the junction 53 between the supply lines 39, 49, the first chemical and the second chemical may combine, creating an additive mixture. If the system 1 has multiple tanks 33, 43, then the chemical additives will flow through the intakes tubes 34, 44 in each tank 33, 43, and flow into the junction 53 to create the additive mixture. If only the first tank 33 has a chemical additive or only the first valve 41 of the first tank 33 is in the open position, the first chemical 35 will be the only chemical that flows through the additive outlet line 55. The additive or additive mixture then flows through the flow meter inlet 57. The flow meter 59 can be used to alter the volume of flow of the additive mixture through the flow meter 59, which thereby controls the available volume of additive mixture that can be pulled into the venturi 13. The additive mixture then flows to the junction 106 where the additive mixture is added to the fluid flowing through the venturi 13.

The venturi 13 is a cost-effective injector, and using it on the bypass conduit 7 helps decrease the overall flow restriction in the system. However, the injection of one fluid into another fluid does not necessarily create a homogeneous mix of the two fluids. Chemical additives injected into a main line fluid do not automatically efficiently mix with the main line fluid. In general, fluids with different densities or viscosities may not effectively mix together or flow at the same rate. Over long pipe lengths, an injected fluid with a higher density than the main fluid it is traveling within may move towards the center axis of the pipe, while the main fluid may move away from the center axis and toward the wall of the pipe.

Density currents occur when fluids of two different densities move at two different velocities and rates while being forced along a channel pipeline. Such an example is when freshwater enters the ocean. The freshwater and saltwater do not mix instantly and the heavier salt water tends to stay on the bottom. Similar phenomenon happens when a heavier, somewhat viscous fluid is injected into the flow of water in a pipeline. The heavier fluid will either sink to the bottom and move slowly along the bottom surface of the pipe or will be pulled into the fastest flow in the center of the axis of the pipe. The result is an uneven proportion of water and chemical mixture. One example of such a result is the ineffective and inefficient application of fertilizer through sprinkler heads when liquid fertilizer is injected into an irrigation conduit. Some areas of lawn will receive high doses of fertilizer and others will hardly receive any. Another example is when a pipeline is to be disinfected with chlorine after being contaminated by sewage. The bleach solution is injected into the stream of flow but it sinks to the bottom of the pipe resulting in and inadequate disinfection and failure of microbiological tests. Use of a static mixer immediately downstream of injection will ensure a homogenous proportional mixture of water and chemical and that it is delivered to its intended purpose.

As noted, in irrigation systems, this phenomenon is problematic and results in an asymmetric distribution of the chemical additive. Irrigation systems contain multiple exit points, like sprinkler heads, for the mixture (the main fluid supply and the chemical additive) being ejected to be applied to the surrounding environment. Exit points located near the beginning of the irrigation line will likely have a lower amount of the chemical additive ejected because the additive flowing inside the pipe will be located towards the center of the pipe. Exit points located furthest away from the injection point will likely have a higher amount of chemical additive ejected because the volume of the water within the irrigation line decreases toward the distal end as more water would have been released through early exit points and the chemical additive flowing in the center backs up at the end of the line. Similarly, under different hydraulic situations, the chemical additive may sink to the bottom of the flow and may be un-proportionally emitted at the lowest exiting point or sprinkler head, also resulting in inadequate distribution.

The asymmetric distribution hinders the ability to tailor the amount of chemical additive to apply to the application. This can result in poor environmental stewardship, as larger quantity of the chemical additive might be applied than allowed per local regulations in order to ensure sufficient coverage over the entire area. In addition, disparate effects could result. Some areas of vegetation could receive less than adequate amounts of nutrients or pest control and thus perform poorly, while other areas of vegetation could receive too much of a particular chemical which could damage or kill the vegetation. It also could cost a user more money, as more chemical additive may be required overall or the chemical additive might have to be individually additionally applied to the section that did not receive the concentration required.

Multiple chemical storage tanks allow for separate injection rates to be introduced into the water stream. The benefit of this multiple rate injection arises from the fact that the solubilities of the three main nutrients in fertilizer are different. Nitrogen is very soluble and is quickly available to the plant material. Phosphorus and potassium are not as soluble and take much longer for enzymes and bacteria present in soil to convert these nutrients into plant available species. Thus, there is an advantage to applying these nutrients individually or separately. Often they are applied together and are listed as N-P-K on packaging. Applying these nutrients together topically in the more traditional granular form often results in phosphorus and potassium being washed or blown off the turf surface and polluting waterways, before they are ever dissolved and up taken by plant material. In fact, many states have banned or restricted the use of fertilizers with phosphorus and potassium because of this problem with the delivery methodology. However, this does not change the fact that plants still need these nutrients to survive and should be considered part of a fertilization regimen.

As described above, when the additive mixture is added to the fluid in the bypass conduit 7, the two fluids may not be thoroughly mixed. The fluid in the bypass conduit 7 with the entrained additive mixture then join the fluid flowing through the main fluid conduit 3 at the outlet 11 of the bypass conduit 7. The chemical additive may not be thoroughly mixed with the fluid and therefore the mixture is heterogeneous even though both the chemical additive and the fluid flow through the main fluid conduit 3. The heterogeneous mixture then flows into the static mixer 19. The flow of the heterogeneous mixture 70 through the static mixer 19 creates a homogenous mixture of the fluid and the chemical additive mixture for delivery through the irrigation line 6 to the application as required.

The upstream pipe connector 25 and downstream pipe connector 27 allow the injection system 1 to be a self-contained unit such that it can be easily added to and removed from irrigation lines in existing irrigation systems as necessary. An existing irrigation line 6 can be excavated at an upstream location in an area of the size of a typical irrigation valve box. The irrigation line 6 can be severed with a gap between upstream and downstream sections of the irrigation line 6. The valve box 2 containing the preassembled injection system 1 can be placed in the excavated area and the upstream pipe connector 25 can be connected to the upstream end of the irrigation line and the downstream pipe connector 27 can be connected to the downstream end of the irrigation line 6. Once the tanks 33, 43 are filled with desired chemical additives, the valves are opened, and the flow meter 59 is adjusted as appropriate, the injection system will provide a homogenous mixture of the chemical additives for distribution through the irrigation line 6 automatically. If chemical additives are not desired for each irrigation session, the valves 15, 17 on the bypass conduit 7 and also the valves on the intake tubes 34, 44 can simply be closed. It should be recognized that any of the valves in the injection system 1 can be either manually or automatically operated (e.g., through solenoid control). Further, different chemical additives can be placed in the tanks 33, 43 at different times to achieve different purposes. For example, different types of fertilizer with different nutrient content may be provided at different times of the year.

The incorporation of the venturi on a bypass line provides an effective injection system without the typical flow restrictions that would be present if a venturi were placed on the main conduit of an irrigation system. The disclosed design also avoids the significant cost and complicated design that other injection systems may require. Furthermore, the combination of the venturi with a downstream static mixer assures that the fluid mixture exiting the system is a homogenous rather than heterogeneous mixture, and that the additive mixture is less likely to become separated from the main fluid within the conduit. This ensures that the mixture will maintain a uniform composition for ejection points located both near the injection system and for ejection points located far downstream from the system. Finally, the injection system is compact and self-contained, such that it can be easily added to existing fluid distribution systems such as irrigation systems.

Figure 6:
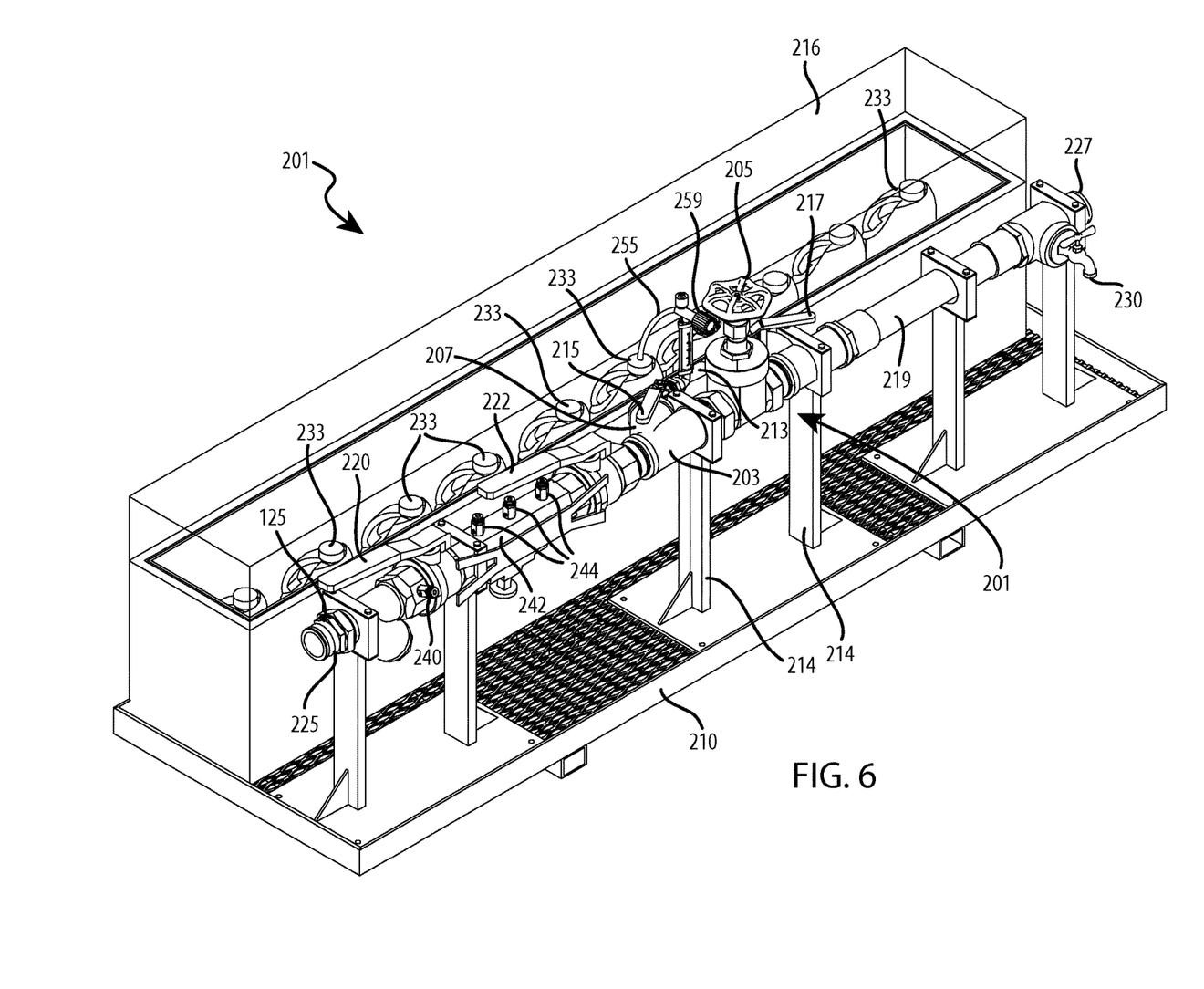
FIG. 6 is an isometric view of an embodiment of a chemical injection system for use in a wash-down station.
Figure 7:
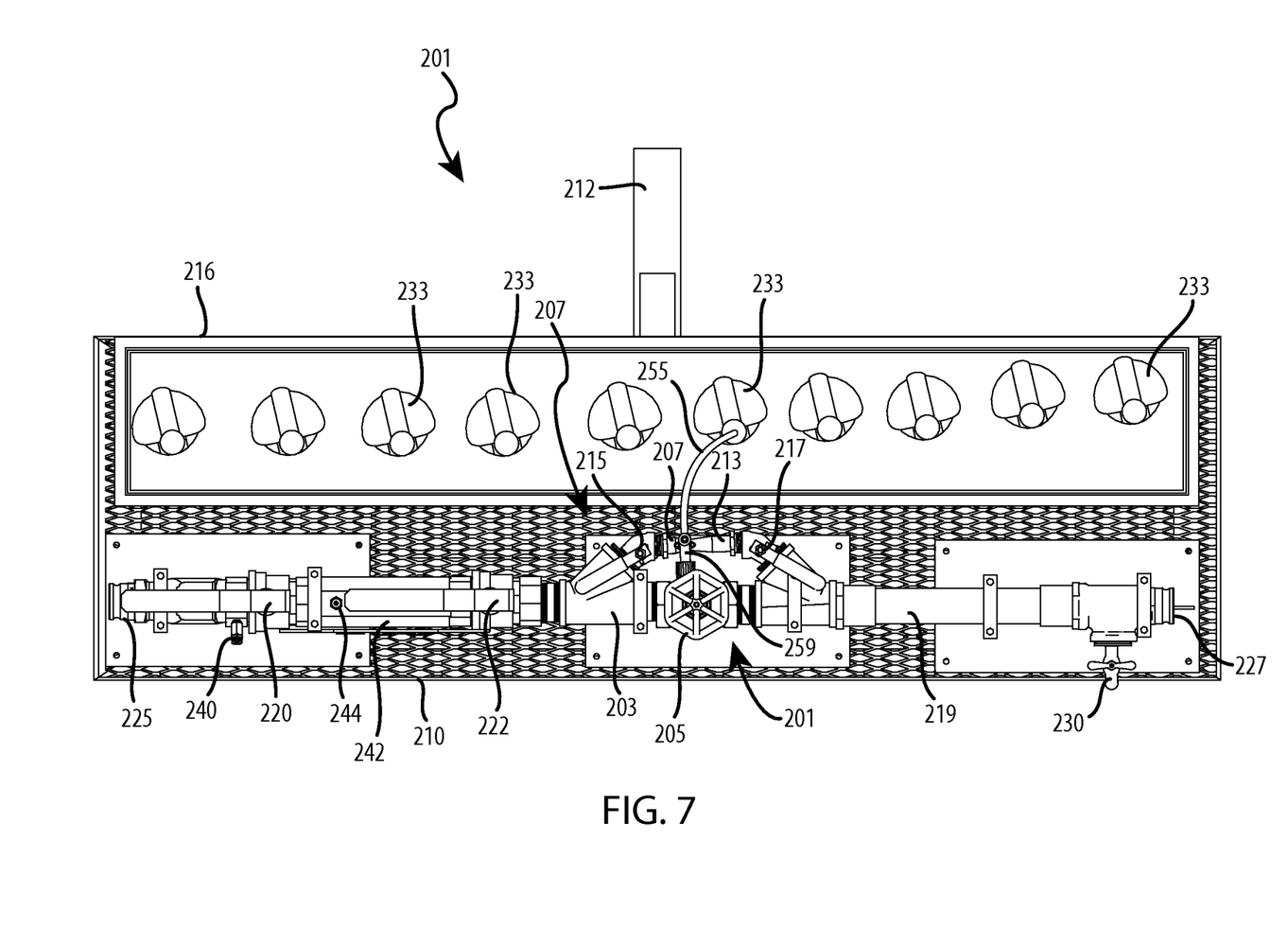
FIG. 7 is a top plan view of the wash-down station shown in FIG. 6.

FIGS. 6 and 7 depict an alternative embodiment of additive fluid injection system 201 configured for use in a wash-down station 202. The wash-down station 202 is depicted as a portable, mobile unit supported on a platform 210 connected to a receiver tongue 212 that can be easily inserted into a trailer hitch receiver on a vehicle. The additive fluid injection system 201 may be supported on the platform 210 by a number of braces 214 to elevate the fluid injection system 1 above the base of the platform 210. A large receptacle 216 may be provided on the platform 210 to hold chemical containers 233.

The fluid injection system 201 may be designed in a similar configuration as the system of the previous embodiment. For example, the system 201 may have a main fluid conduit 3 with an upstream pipe connector 225 for connecting the main fluid conduit 3 with a water source. A backflow prevention or "dumping" valve 242 may be provided adjacent the upstream pipe connector 225 to relieve pressure and dump water during a backflow event, thereby preventing chemical laden or otherwise unpotable water from reaching the water source. The dumping valve 242 may have two inline shutoff valves 220, 222 positioned at an inlet and an outlet thereof and a number of test cocks 240, 244 positioned thereon. A bypass conduit 207 with a venturi 213 may extend from and return to the main line 203. An upstream valve 215 and a downstream valve 217 may be provided on the bypass conduit 207 on either side of the venturi 213. A mixing valve 259 may be connected to the throat of the venturi 213 or at the opening to the diffuser side thereof. A flow restriction valve 205 may be provided on the main fluid line 203 between the inlet to and the outlet from the bypass conduit 207. A static mixer may be placed in-line with the main fluid line 203 downstream of the bypass conduit 207. In the configuration shown, the downstream end of the main fluid line 203 may be closed off with a cap 227. However, immediately upstream of the cap 227 and downstream of the static mixer 219, a spigot valve 230 may be provided to allow easy hook-up to a hose for providing the wash-down application.

As shown in FIGS. 6 and 7, the receptacle 216 may contain multiple individual chemical containers 233. For example, a number of conventional or industrial bottles of bleach could be placed in the receptacle 233 and supported on the platform 210. In another example, multiple different types of chemical additives in individual containers could be stored in the receptacle. In this embodiment, a single outlet line 255 is provided extending from the mixing valve 259 into one of the containers 233. In such an embodiment, the outlet line 255 could be manually placed in a desired one of the several chemical containers 233. Once the particular container 233 empties, the outlet line 255 could be manually placed in a different container 233. In another Implementation (not shown), each container 233 could be attached to a separate outlet line 255 which could then be connected together by a manifold or otherwise joined together at a junction, which would then fluidly connect to the inlet of the flow meter 59, such that all outlet lines 255 would connect directly with the bypass conduit 207. The interface between the outlet lines 255 and the containers 233 may have a venting mechanism to ensure a vacuum is not created. Alternatively, if the openings of the containers are of larger diameter than the diameter of the outlet line 255, a vacuum would be avoided.

The venturi bypass injection system disclosed herein allows for a simple, cost effective and efficient chemical injection method. The use of multiple tanks containing different chemicals, and as well as valves at the outlet lines of those tanks allow a user to confidently customize the amount of chemicals used in the chemical additive mixture. The amounts of chemicals or types of chemicals can be changed as much as needed to tailor the best chemical additive solution for the end application. Placement of the static mixer immediately downstream of the location where the bypass line rejoins the main fluid supply line ensures that the chemical additive injected into the bypass fluid will be efficiently mixed to create a more homogenous mixture to supply for an application. The chemical additive will be uniformly distributed to the end application without variation of concentration regardless of the ejection point location within the system. Finally, the compact, self-contained, and portable aspects of the system allows for installation in existing applications as well as new applications.

Although various representative embodiments have been described above with a certain degree of particularity, those skilled in the art could make numerous alterations to the disclosed embodiments without departing from the spirit or scope of the claimed invention. All direction references (e.g., upper, lower, upward, downward, left, right, leftward, rightward, top, bottom, above, below, vertical, horizontal, clockwise, counterclockwise, upstream and downstream) are only used for identification purposes to aid the reader's understanding of the embodiments of the present invention, and do not create limitations, particularly as to the position, orientation, or use of the invention unless specifically set forth in the claims. Joinder references (e.g., attached, coupled, connected, fluidly connected and the like) are to be construed broadly and may include intermediate members between a connection of elements and relative movement between elements. As such, joinder references do not necessarily infer that two elements are directly connected and in fixed relation to each other.

In some instances, components may be described with reference to "ends" having a particular characteristic and/or being connected with another part. However, those skilled in the art will recognize that such components are not limited to components that terminate immediately beyond their points of connection with other parts. Thus, the term "end" should be interpreted broadly, in a manner that includes areas adjacent rearward, forward of, or otherwise near the terminus of a particular element, link, component, part, member of the like.

In methodologies directly or indirectly set forth herein, various steps and operations are described in one possible order of operation, but those skilled in the art will recognize that steps and operations may be rearranged, replaced, or eliminated without necessarily limiting or changing the function or results achieved by such methodologies. It is intended that all matter contained in the above description or shown in the accompanying drawings shall be interpreted as illustrative only and not limiting. Changes in detail or structure may be made without departing from the spirit of the invention as defined in the appended claims.

What is claimed is:

1. A fluid mixing and delivery system for insertion inline into an irrigation system comprising
   a main fluid conduit with an inlet, an outlet, and a main fluid conduit diameter, wherein the main fluid conduit is configured for flow of a first fluid between the inlet and outlet;
   a bypass conduit with an inlet, an outlet, and a bypass conduit diameter that is smaller than the main fluid conduit diameter, wherein
      the bypass conduit inlet connects to the main fluid conduit downstream of the main fluid conduit inlet and the bypass section outlet connects to the main fluid conduit at a first junction upstream of the main fluid conduit outlet, and
      wherein the bypass conduit is configured to divert a diverted portion of the first fluid from the main fluid conduit into the bypass conduit at the bypass conduit inlet while a non-diverted portion of the first fluid is configured to remain flowing in the main fluid conduit;
   a venturi located in-line with the bypass conduit between the bypass conduit inlet and the bypass conduit outlet;
   a valve located in-line with the bypass conduit between the bypass conduit inlet and bypass conduit outlet, wherein the valve is configured to be adjusted between an open and a closed position to control flow of the diverted portion of the first fluid through the venturi in the bypass conduit;
   a first chemical storage tank configured to store a second fluid and fluidly connected to an individual supply line, wherein the individual supply line fluidly connects to the venturi; and
   a static mixer located in-line with the main fluid conduit and positioned downstream of the first junction and upstream of the main fluid conduit outlet, wherein the static mixer comprises an inlet, an outlet, and a mixing conduit between the inlet and the outlet of the static mixer, and further includes a plurality of mixing elements positioned within the mixing conduit at various angles with respect to an inner wall defining the mixing conduit and which extend across a center portion of the mixing conduit, wherein the inlet and outlet of the main fluid conduit are configured for the inline insertion into the irrigation system;

wherein when the valve is positioned in an open position,
the diverted portion of the first fluid is configured to flow through the venturi,
the second fluid is configured to be entrained into the diverted portion of the first fluid as the diverted portion of the first fluid flows through the venturi,
the entrained second fluid and diverted portion of the first fluid are configured to be fluidly combined with the non-diverted portion of the first fluid at the bypass conduit outlet, and
the entrained second fluid is substantially homogenously mixed with the non-diverted portion and diverted portion of the first fluid when passing through the static mixer before passing through the outlet into the irrigation system; and wherein when the valve is positioned in the closed position, the diverted portion of the first fluid is not configured to flow through the venturi in the bypass conduit.

2. The fluid mixing and delivery system of claim 1 further comprising a fluid metering device that fluidly connects the individual supply line and the venturi.

3. The fluid mixing and delivery system of claim 2, wherein
the venturi comprises a confuser portion, a throat portion, and a diffuser portion; and
the fluid metering device is fluidly connected to the throat portion.

4. The fluid mixing and delivery system of claim 1, wherein the first chemical storage tank contains a first intake tube extending from a bottom of the first chemical storage tank upward and through a top wall of the first chemical storage tank and fluidly connects to the individual supply line.

5. The fluid mixing and delivery system of claim 4, wherein the first intake tube has a bottom with a plurality of slots.

6. The fluid mixing and delivery system of claim 2 further comprising
a plurality of chemical storage tanks, each respectively having an intake tube with a base defining a plurality of slots and fluidly connected to an individual supply line; and
the individual supply lines are fluidly connected to each other at a second junction upstream of the fluid metering device.

7. The fluid mixing and delivery system of claim 6 further comprising a plurality of valves, each located in-line with one of the individual supply lines upstream of the second junction.

8. The fluid mixing and delivery system of claim 2 further comprising a flow restriction valve located in-line with the main fluid conduit between the bypass conduit inlet and the bypass conduit outlet and configured to control flow of the non-diverted portion of the first fluid.

9. The fluid mixing and delivery system of claim 1 further comprising a valve box, wherein the system is contained within the valve box and is configured to be added to an existing fluid delivery system supplying the first fluid through a connection point upstream of the main fluid conduit inlet and a connection point downstream of the main fluid conduit outlet.

10. The fluid mixing and delivery system of claim 1, wherein the system is positioned on a portable platform.

11. The fluid mixing and delivery system of claim 10 further comprising a plurality of chemical storage tanks, each respectively having an individual supply line, and wherein the individual supply lines are fluidly connected to each other at a second junction upstream of the venturi.

12. The fluid mixing and delivery system of claim 10 further comprising a flow restriction valve located in-line with the main fluid conduit between the bypass conduit inlet and the bypass conduit outlet and configured to control flow of the non-diverted portion of the first fluid.

13. The fluid mixing and delivery system of claim 10 further comprising a fluid metering device that fluidly connects the individual supply line and the venturi.

14. The fluid mixing and delivery system of claim 10 further comprising a hitch receiver tongue attached to the portable platform.

15. The fluid mixing and delivery system of claim 10 further comprising a cap covering and closing the outlet of the main fluid conduit and a spigot located upstream of the cap.

* * * * *